United States Patent [19]

Hoffman

[11] 4,075,522

[45] Feb. 21, 1978

[54] SELF CLAMPING ARMATURE CASING FOR AN ELECTRIC MOTOR DRIVEN FLUID PUMP

[75] Inventor: Robert P. Hoffman, Grand Blanc, Mich.

[73] Assignee: General Motors Corporation, Detroit, Mich.

[21] Appl. No.: 714,382

[22] Filed: Aug. 16, 1976

[51] Int. Cl.² .............................................. H02K 3/48
[52] U.S. Cl. ..................................... 310/214; 310/42; 310/87; 310/265
[58] Field of Search ........................ 310/66, 67, 42, 43, 310/45, 87, 91, 211, 214, 216, 217, 218, 194, 261, 263, 262, 264, 265, 269, 270, 271; 417/410, 420

[56] References Cited

U.S. PATENT DOCUMENTS

| | | | |
|---|---|---|---|
| 1,808,568 | 6/1931 | Page | 310/261 |
| 2,316,635 | 4/1943 | Staak | 310/214 |
| 2,632,123 | 3/1953 | Kober | 310/261 |
| 2,786,953 | 3/1957 | Schaefer | 310/42 UX |

Primary Examiner—R. Skudy
Attorney, Agent, or Firm—Robert M. Sigler

[57] ABSTRACT

The armature of an electric motor driven pump has a casing comprising a first end cap covering the end turns at one end of the armature core with a plurality of integral axially extending fingers disposed respectively in slots within the core, the fingers having means wedging them in the slots to prevent radial outward movement and a hook on the end of each having a ramp surface sloping radially inward from the end of the finger. The casing further comprises a second end cap covering the end turns at the opposite end of the core with an outwardly extending circumferential flange engaged by the hooks, whereby the first and second end caps are clamped to each other and retained on the armature.

1 Claim, 3 Drawing Figures

SELF CLAMPING ARMATURE CASING FOR AN ELECTRIC MOTOR DRIVEN FLUID PUMP

SUMMARY OF THE INVENTION

This invention relates to armature casings for electric motor driven fluid pumps and particularly such casings comprising two parts with integral co-engagement means providing easy assembly of the armature and positive retention thereon with no additional parts.

It is known to provide a casing for an armature in an electric motor driven pump where the armature is to be rotated within a fluid medium. The casing possesses a smoother surface than the core and windings a reduces turbulence within the fluid due to the rotation of the armature and thereby increases the effficiency of the pump.

In the past, such casing means have comprised an end cap covering the end turns at one end of the armature core and having a plurality of projecting axial fingers disposed in the core slots and having means wedging the fingers in the slots to prevent radial outward movement. The casing means have further comprised an end cover covering the end turns at the other end of the armature core, a retaining ring for retaining the second end cover on the armature and a plurality of resilient fingers on the inside of the first end cover to frictionally engage the commutator and thus retain the first end cover on the armature. These means for retaining the casing means on the armature are cumbersome and require necessary extra parts and labor in assembly.

This invention replaces the prior cumbersome retaining means with new retaining means integral with and easily formed on the casing means, automatically engageable during assembly and requiring no additional parts. In accordance with this invention, hooks are provided at the ends of the fingers disposed in the slots; and the fingers project beyond the ends of the slots. A circumferential outwardly extending flange is provided on the other end cap for engagement by the hooks, each hook having an inward ramp surface causing the hook to ride outward and over the flange during assembly. The engagement of the arms with the core slots is used, when the hooks pass the flange, to cause the hooks to snap into engagement with the flange and thus cause retention of the casing means on the armature.

Further details and advantages of this invention will be apparent from the accompanying drawings and following description of a preferred embodiment.

DESCRIPTION OF THE PREFERRED EMBODIMENT

Figure 1:
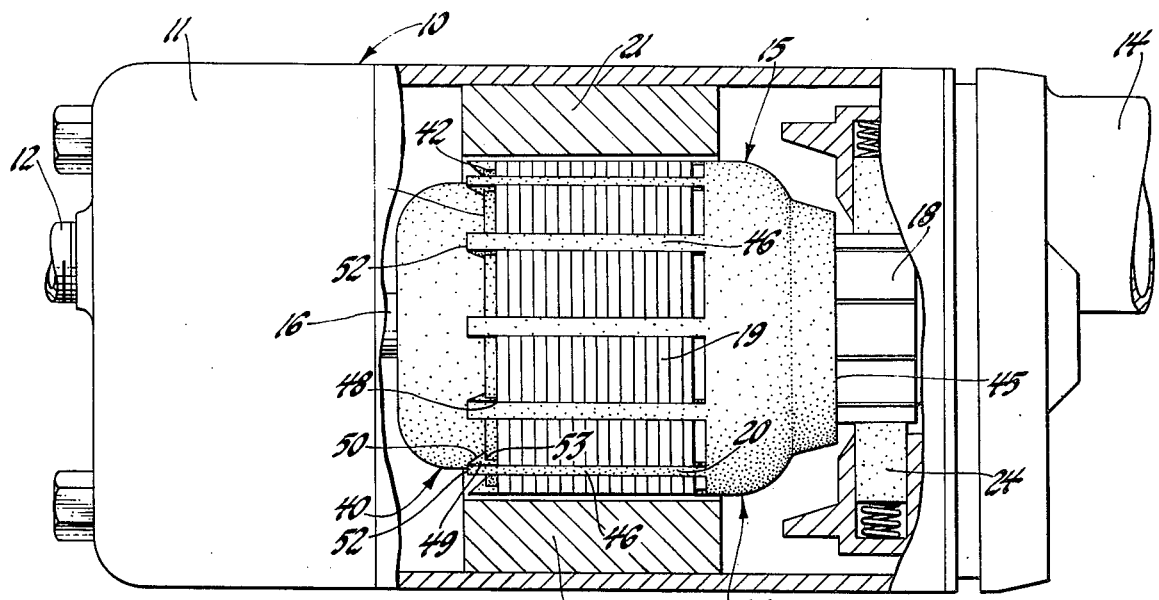
FIG. 1 shows a side view, partially cutaway, of an electric motor driven fluid pump having an armature with casing means according to this invention.

Referring to FIG. 1, an electric motor driven fluid pump 10 adapted for submerged operation in an environment such as a vehicle fuel tank has a case 11 with a fluid inlet 12 at one end, a fluid outlet 14 at the other end and a motor armature 15 rotatably disposed therein with provision for flow of the pump fluid through case 11 past armature 15 for cooling thereof. The pumping means itself is not shown, since its particular design is irrelevant to this invention; it may be any convenient and appropriate pumping means adapted to be actuated by the rotation of armature 15 and producing said axial flow of fluid through casing 11 from inlet 12 to outlet 14.

Figure 2:
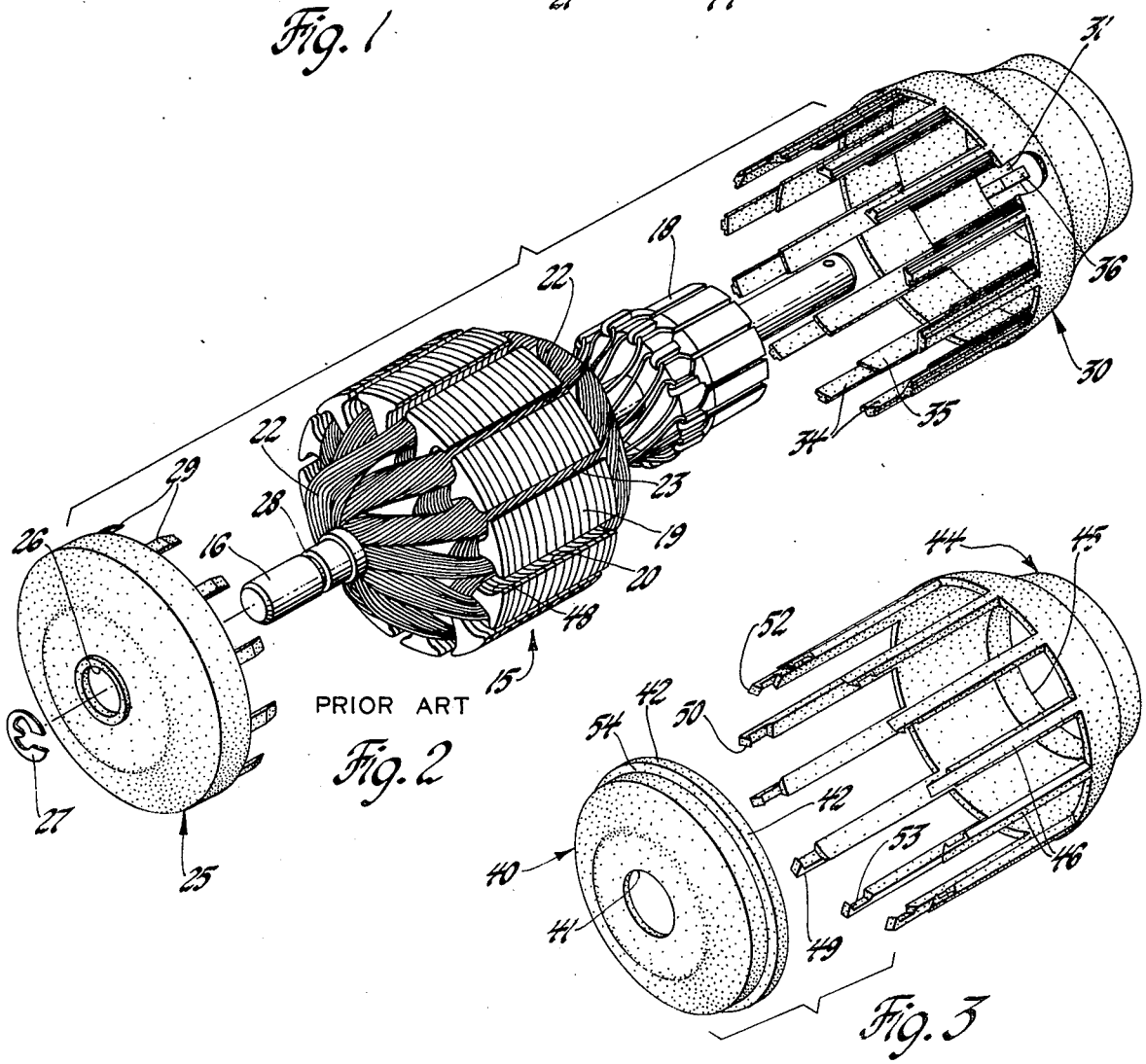
FIG. 2 shows a perspective view of prior art casing means suitable for use on the pump of FIG. 1.

Armature 15 is of typical design, having a shaft 16 rotatably supported within casing 11 and further including, as shown in FIG. 2, a commutator 18, a core 19 with axial slots 20 and windings on the core including end turns 22 at opposite axial ends of the core and conductors 23 within slots 20. Armature 15 rotates within a field structure shown as permanent magnets 21 with commutator 18 engaging collector apparatus 24.

Without streamlined casing means covering core 19 and its windings, the rotation of armature 15 would produce turbulence within the fluid flowing through case 11 which would waste energy and thereby decrease the efficiency of pump 10. The provision of streamlined casing means over core 19 reduces such turbulence and thereby increases the efficiency of pump 10.

Casing means according to the prior art is shown in FIG. 2. A first end cap 25, made of a convenient plastic material, covers the end turns at the opposite end of core 19 from commutator 18, with shaft 16 projecting through an opening 26 in said end cap 25. A retaining ring 27 is seatable in a groove 28 in shaft 16 to retain end cap 25 on armature 15. End cap 25 is provided with a plurality of short stubby fingers 29 which project partially into slots 20.

A second end cap 30 covers the end turns adjacent commutator 18 and has a larger opening 31 to allow assembly over commutator 18. End cap 30 has a plurality of parallel axially extending fingers 34 for disposal in slots 20, each finger 34 having a wide radially inward base 35 effective to retain it within its appropriate slot 20 during operation of the pump 10. End cap 30 is provided with a plurality of resilient fingers 36 on the inside thereof adjacent opening 31 to frictionally engage commutator 18 and retain end cap 30 on armature 15. End cap 30 is partially cut away in FIG. 2 to show one such finger 36.

Figure 3:
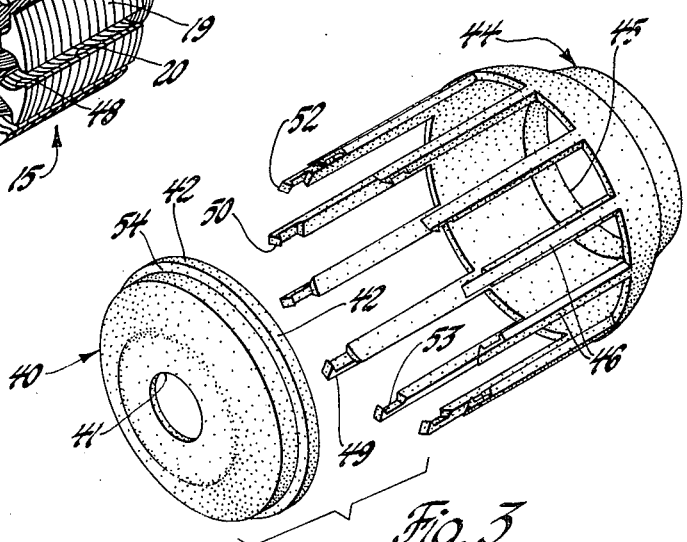
FIG. 3 shows a perspective view of casing means shown in FIG. 1.

Improved casing means according to this invention are shown in FIGS. 1 and 3. A first end cap 40 covers the end turns at the opposite end of core 19 from commutator 18. End cap 40 has an opening 41 for shaft 16 and a generally outwardly extending peripheral flange 42. End cap 40 is easily moldable from a convenient plastic material.

A second end cap 44, made from the same or similar material, covers the end turns adjacent commutator 18 and has a larger opening 45 to allow assembly over commutator 18. End cap 44 has a plurality of parallel, axially extending fingers 46 disposed in slots 20 and projecting therethrough and out the end 48 thereof opposite commutator 18. "As is apparent from FIG. 3, fingers 46 are wedge-shaped in cross section, but any shape is permissible that will retain the fingers in slots 20 against outward movement therefrom." On the free end of each finger 46 is a hook 49 comprising a ramp surface 50 sloping radially inward from the end 52 of the finger and intersecting a catch surface 53 which engages a corresponding catch surface or side 54 of flange 42 whereby the end caps 40 and 44 are clamped together and both retained on armature 15 over core 19.

During assembly, end cap 40 is advanced axially over shaft 16 to the end turns at the opposite end of core 19 from commutator 18. End cap 44 is advanced axially over the opposite end of shaft 16 and commutator 18 with fingers 46 moving through slots 20 until hooks 49 pass out through end 48 of slots 20 and ramp surfaces 50 engage flange 42. With further axial movement of end caps 40 and 44 together, ramp surfaces 50 cause hooks 49 to move radially outward and over flange 42. Since most of each finger 46 is prevented from moving radially outward by axial slot 20, a bending tension is produced near the end 52 of fingers 46, which tension causes hooks 49 to snap back inward when they pass flange 42 so that catch surfaces 53 and 54 come into engagement and prevent end caps 40 and 44 from being pulled axially off armature 15.

This invention requires no inner resilient fingers on end cap 44 and no retaining rings or other extra parts to hold either of end caps 40 or 44 on armature 15. The engagement and retention of end caps 40 and 44 is accomplished easily during assembly as described above by merely pushing them together on armature 15. If desired, they can be removed by prying a few of the hooks 49 outward while pulling the end caps 40 and 44 apart. Otherwise, however, the end caps will remain in position on armature 15 during the operation of pump 10.

The embodiment described above is the preferred embodiment. However, since equivalent embodiments will occur to those skilled in the art, this invention should be limited only by the claim which follows.

I claim:

1. In an armature of an electric motor driven pump, the armature being adapted for rotation within a fluid medium and including a core with axially extending slots, a winding comprising conductors disposed in the slots and end turns disposed across the opposite axial ends of said core, and two part casing means enclosing the core, conductors and end turns for reducing armature induced fluid turbulence, the casing means comprising first and second end caps covering the end turns at opposite axial ends of the core, the first end cap having a plurality of integral axially extending fingers slidably disposed respectively in the core slots, the armature further having means wedging the fingers in the slots against radial outward movement, the improvement comprising, in combination:

an outwardly extending circumferential flange on the second end cap adjacent the axial ends of the core slots; and a plurality of hooks, one on the end of each finger, adapted to engage a side of the flange to clamp the first and second end caps to each other for retention on the armature, each hook having a ramp surface sloping radially inward from the end of the finger, the ramp surface being cooperative with the flange, upon axial movement of the fingers during assembly, to force the respective hook radially outward over the flange into locking engagement therewith.

* * * * *